United States Patent [19]

Bishop

[11] Patent Number: 4,741,656
[45] Date of Patent: May 3, 1988

[54] CYLINDRICAL BALE FEEDER

[76] Inventor: W. Ray Bishop, Box 156, New Pine Creek, Oreg. 97635

[21] Appl. No.: 858,742

[22] Filed: May 2, 1986

[51] Int. Cl.$^4$ ...................... A01D 87/02; A01D 90/10
[52] U.S. Cl. .................................. 414/24.6; 241/101.7; 414/111; 414/502; 414/911
[58] Field of Search ................ 241/101.7; 242/86.5 R; 414/24.5, 911, 24.6, 111, 25, 502, 552

[56] References Cited

U.S. PATENT DOCUMENTS

| | | | |
|---|---|---|---|
| 3,841,504 | 10/1974 | Spasuik | 414/551 |
| 3,874,609 | 4/1975 | Larson | 242/86.5 R |
| 3,924,765 | 12/1975 | Hostetler | 414/24.6 X |
| 3,941,265 | 3/1976 | Nunally, Jr. | 414/482 |
| 3,968,940 | 7/1976 | Godbersen | 242/86.5 R |
| 4,084,707 | 4/1978 | McFarland | 414/24.6 |
| 4,161,253 | 7/1979 | Ralston et al. | 414/25 |
| 4,376,607 | 3/1983 | Gibson | 414/24.6 |
| 4,441,845 | 4/1984 | Gibson | 414/24.6 |
| 4,459,075 | 7/1984 | Eichenberger | 414/552 X |

FOREIGN PATENT DOCUMENTS

| | | | |
|---|---|---|---|
| 1073218 | 3/1980 | Canada | 414/24.5 |
| 2271868 | 7/1978 | France | 414/24.6 |
| 2048211 | 12/1980 | United Kingdom | 414/24.6 |

OTHER PUBLICATIONS

Forster Pamphlet entitled "Your Total Round Bale Handling System".
Turnbow Manufacturing Pamphlet entitled "Round Bale Dispenser".
Vermeer Manufacturing Company Pamplet entitled "Bale Carriers", 4-1980.

*Primary Examiner*—L. J. Paperner
*Assistant Examiner*—Janice Krizek
*Attorney, Agent, or Firm*—Kolisch, Hartwell & Dickinson

[57] ABSTRACT

The field vehicle of the instant invention includes an elongate mobile vehicle frame which is supported for movement over the ground, and an elongate conveyor extending along the length of the frame. The conveyor is constructed to support a series of bales in end-to-end relationship and to move the bales endo along the frame in a path extending axially of the frame. A bale unrolling mechanism is aligned with the conveyor to receive a bale moved thereinto by the conveyor. The bale unrolling mechanism includes a support for supporting the underside of the bale occupying the unrolling mechanism. The support includes rolls that are rotated to produce rotation of the bale thereon about its axis.

4 Claims, 2 Drawing Sheets

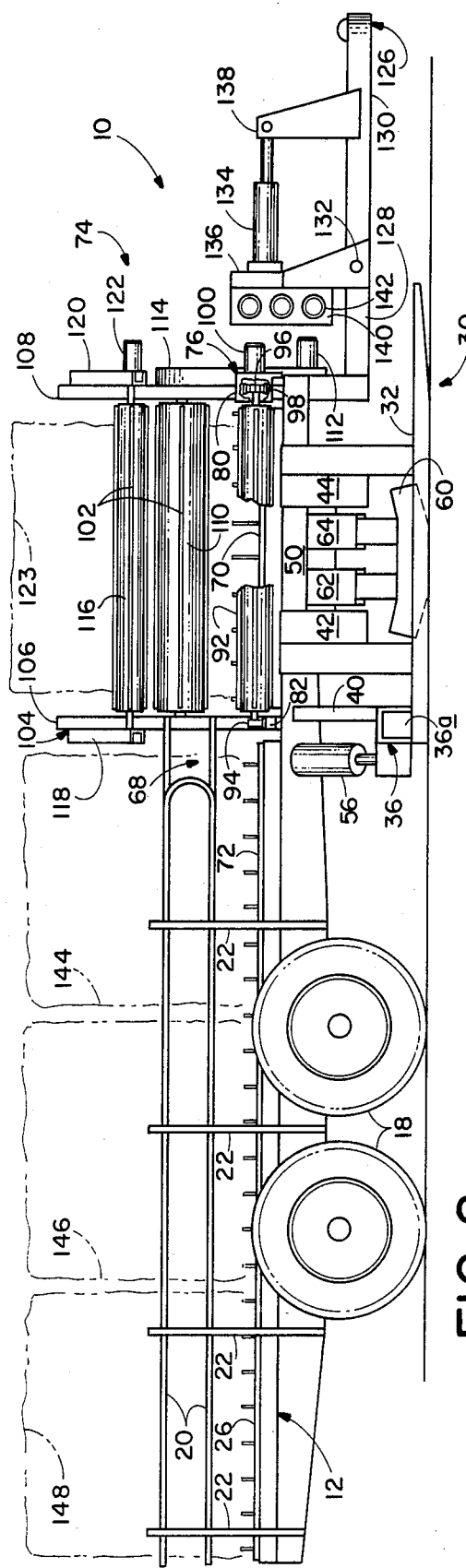
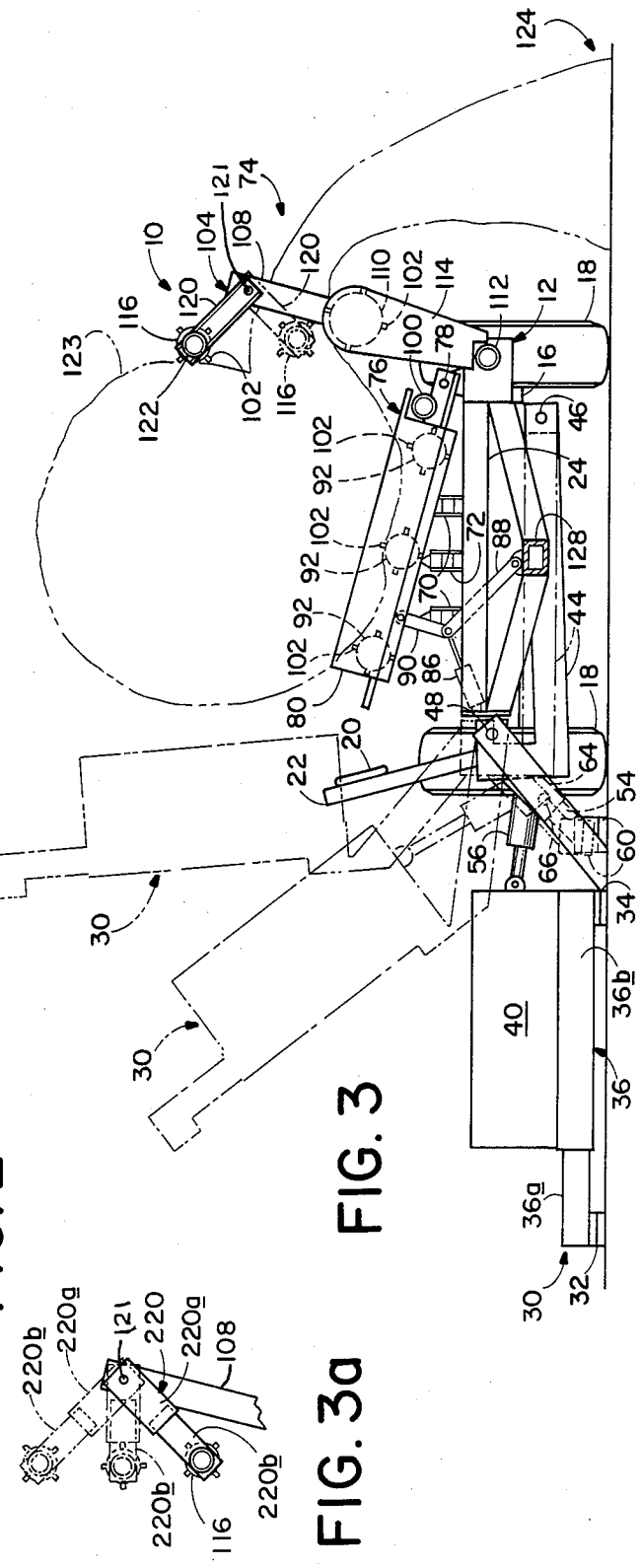
FIG. 2
FIG. 3
FIG. 3a

CYLINDRICAL BALE FEEDER

BACKGROUND AND SUMMARY OF THE INVENTION

The instant invention relates to an agricultural vehicle, specifically to a vehicle which is operable to load, transport and dispense material from a wound bale.

The use of wound bales for collecting and storing material, such as hay, has become increasingly popular over the past several decades. Wound bales may be easily formed and compacted and facilitate the gathering and shipment of large quantities of hay. A wound bale is more able to withstand environmental elements than a rectangular bale and it is therefore desirable to use the wound configuration.

The handling of a wound bale, however, presents several difficulties in that several bales do not generally neatly compact adjacent one another and the weight of the bale makes conventional handling difficult. Wound bales may weigh between 1,500 and 3,000 pounds.

Known devices include a "spear," which impales the wound bale along its central axis and then rotates the bale dispensing the material thereof. Other devices support a bale at either end at its axis and unwind the baled material.

It is desirable, when unwinding baled material that, when the material is deposited on the ground, it not be dispensed in a flat mat, rather the material should be dispensed to form a windrow, which rises somewhat above the ground surface and does not allow the now dispensed material to be trampled into the ground by livestock.

An object of the instant invention is to provide a field vehicle for handling wound cylindrical bales which is capable of lifting a bale from the ground, transporting the bale, and dispensing the material of the bale alongside the vehicle.

Another object of the instant invention is to provide a field vehicle which is stabilized to prevent twisting of the vehicle frame.

Another object of the instant invention is to provide a field vehicle which is operable to unroll a wound bale and deposit the material thereof in a windrow alongside the vehicle.

A further object of the instant invention is to provide a field vehicle which has means for unrolling a wound bale regardless of the direction of bale winding.

Still another object of the instant invention is to provide a field vehicle which is operable to transport wound bales endo along the length of the vehicle.

The field vehicle of the instant invention includes an elongate mobile vehicle frame which is supported for movement over the ground, and an elongate conveyor extending along the length of the frame. The conveyor is constructed to support a series of bales in an end-to-end relationship and to move the bales endo along the frame in a path extending axially of the frame. Bale unrolling means are aligned with the conveyor to receive a bale moved thereinto by the conveyor. The bale unrolling means includes a support for supporting the underside of the bale occupying the unrolling means and means for moving the support to produce rotation of the bale thereon about its axis.

These and other objects and advantages of the instant invention will become more fully apparent as the description which follows is read in conjunction with the drawings.

DESCRIPTION OF THE DRAWINGS

FIG. 2 is a side plan view of the vehicle, taken generally along line 2—2 of FIG. 1, with portions broken away to show detail.

FIG. 3 is a front end view of the vehicle, with portions broken away to show detail, taken generally along the line 3—3 of FIG. 1.

FIG. 3a is a partial front view of a modified form of a bale separator, constructed according to the invention.

DETAILED DESCRIPTION OF THE PREFERRED EMBODIMENT

Figure 1:
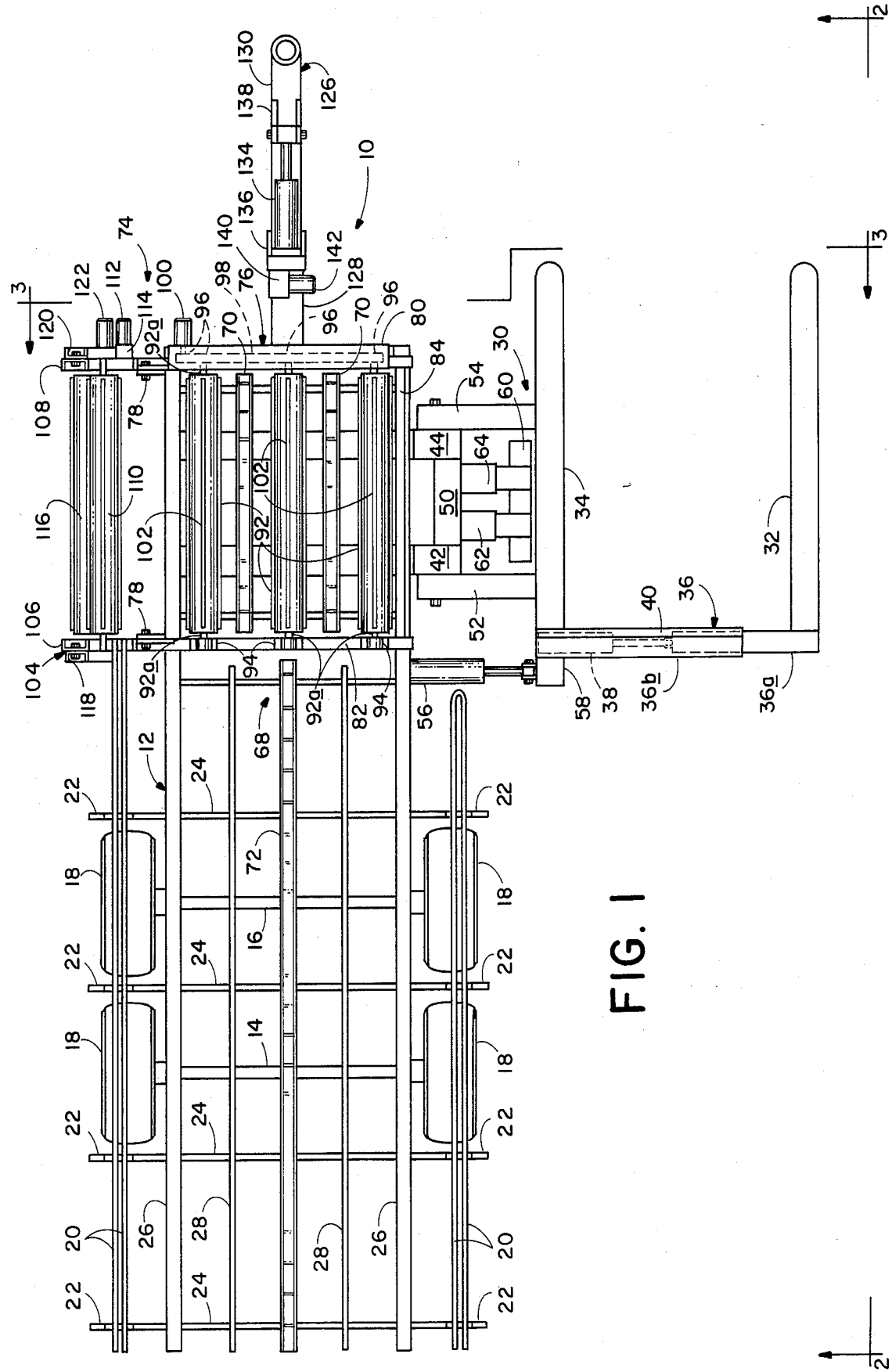
FIG. 1 is a top plan view of a field vehicle constructed according to the invention.

Turning now to the drawings, and initially to FIGS. 1 and 2, a field vehicle constructed according to the invention is shown generally at 10. Vehicle 10 includes an elongate mobile vehicle frame, 12 which is mounted on axles 14, 16 having wheels 18 thereon and allowing for movement of vehicle 10 across the ground.

Frame 12 includes side rails 20 which are mounted on diagonal uprights 22, which in turn extend from frame cross members 24. Longitudinally extending frame members 26 run the length of the vehicle and, along with stringers 28, provide a sliding surface for carrying in a bale storage region multiple, spiral rolled bales which are moved axially along the length of the frame.

A lifting fork, shown generally at 30 is mounted on one side of frame 12 and is operable to pick up a bale resting on the ground. Fork 30, also referred to herein as side-loading means, includes a pair of fork members 32, 34 and a fork cross member 36. Member 36 includes a telescoping portion 36a, which is attached to fork member 32, and a receiving portion and along the bale storage region 36b which is fixed to fork member 34. A ram 38 is contained within receiving portion 36b and is operable to extend telescoping portion 36a, thereby varying the distance between fork member 32 and fork member 34, allowing the vehicle to pick up bales of varying size. A backstop 40 is mounted atop receiving portion 36b and is operable to prevent the escape of a bale off of the rear side of the lifting fork.

In the preferred embodiment, lifting fork 30 is secured to the vehicle by a pair of lifting fork mounting arms 42, 44. Arms 42, 44 are pivotably mounted on frame 12 on the other side of the frame from lifting fork 30 by a pivot means, or pin 46. Arms 42, 44 are, in the preferred embodiment, somewhat J-shaped and extend from pivot pin 46 on the underside of frame 12 to a second pivot point 48 on the frame's one side, where they are joined together by a cross piece 50. Lifting fork 30 is attached to arms 42, 44 by brackets 52, 54, respectively extending to pivot 48.

Referring now to FIG. 3, lifting fork 30 is shiftable between a pick-up position, shown in solid lines, an unload position, shown in dash-dot lines, and a travel position, shown in dash-double-dot lines. Returning to FIGS. 1 and 2, a ram 56, also referred to herein as shifting means, is fixed to one side of frame 12 and extends to a mount 58, located to the rear of fork member 34. When ram 56 is in its fully contracted position, the lifting fork is in its pick-up position and is operable to pick up bales from the ground. As ram 56 is extended, lifting fork 30 moves toward its unload position, which is a position intermediate the pick-up position and travel position, where a bale picked up by the lifting forks will roll onto frame 12.

When ram 56 is fully extended, lifting fork 30 is in its travel position, and arms 42, 44 are raised against the bottom of the right side of frame 12.

The lifting of a bale by lifting fork 30 can be seen to apply a significant torquing load to frame 12. For this reason, stabilization means, or stabilization skid, 60 is provided to support lifting fork 30. Skid 60 is supported by legs 62, 64 which are manually adjustable for height by sliding the lower portion of the legs into the upper portion thereof and fixing the length of the legs with pins 66.

Stabilization skid 60 is shiftable between an operating position, where the skid contacts the ground, as shown in solid lines in FIG. 3, and a travel position, where the skid is lifted above ground level, as shown in dash-double-dot lines in FIG. 3. In the preferred embodiment, the stabilization skid is shifted between its operating position and travel position as lifting fork 30 is shifted between its unload position and its travel position, as ram 56 extends to its maximum extension. When lifting fork 30 is being shifted between its pick-up position and its unload position, the weight of the bale carried on the lifting fork is substantially carried by stabilization skid 60, instead of carrying the load on frame 12 which would place a very heavy, twisting outboard load on the frame.

Vehicle 10 includes a conveyor 68, also referred to herein as elongate conveyor means. Conveyor 68 extends along the length of the frame and is constructed to move wound bales endo along the length of the frame, with the bales being carried in end-to-end relationship to one another. Conveyor 68 includes a first longitudinal conveyor portion 70 which is located at the forward end of the frame, adjacent the lifting fork and in a loading region of the vehicle. First portion 70, in the preferred embodiment, comprises a pair of endless conveyor chains having bale-engaging dogs thereon. A second longitudinal portion 72 extends along frame 12 away from the first portion. A bale loaded by lifting fork 30 will initially be deposited on first conveyor portion 70. The conveyor is operable to shift the bale rearward along the frame, onto second portion 72. Portions 70 and 72 are independently operable so that the bales may be arranged on the vehicle with varying amounts of spacing therebetween.

Bale unrolling means are provided to unroll the material of the bale and deposit the material in a windrow alongside the vehicle as the vehicle is pulled by a towing vehicle. Bale unrolling means, or dispenser, is shown generally at 74. In the preferred embodiment, the dispenser includes a subframe 76 which is mounted adjacent the forward end of the frame and is swingably mounted by pins 78 on the other side of frame 12 opposite lifting fork 30. Subframe 76 includes a pair of transverse members or assemblies 80, 82 which extend across the upper surface of frame 12, and which are joined by a connecting rod 84 at the right side of the vehicle. A ram 86 is operable with a pair of lifting rods 88, 90 to raise the free side of said frame 76 while the other side pivots about pins 78. Ram 86 and rods 80, 90 comprise what is referred to herein as powered means for tilting subframe 76 toward winding and separating means, to be described later herein.

Subframe 76 in the preferred embodiment further includes plural rollers 92 which are rotatably mounted by bearings 94 on transverse member 82 and which have a rotatably mounted shafts 92a extending from the other end thereof into transverse member 80. Shafts 92a have mounted thereon sprockets 96 which are connected by a chain 98 to a hydraulic motor 100, which is operable to drive rollers 92, thereby rotating a bale carried thereon. Motor 100 is reversible and is therefore operable to drive rollers 92 in a clockwise or counterclockwise rotation. Rollers, or bale rotating means, 92 have raised, bale engaging strips 102 mounted about their surfaces and extending the lengths thereof. Rollers 92 comprise what is referred to herein as bale support means which is operable to support the underside of a bale. Subframe 76, rollers 92, and the drive mechanism therefor, comprise what is referred to herein as a bale handling station.

Dispenser 74 also includes a bale separator, or winding-separating means, 104. Separator 104 includes a pair of uprights 106, 108 which are secured to the left side of frame 12. A first separator roller 110 is mounted between uprights 106, 108 and is driven by a hydraulic motor 112 through a sprocket and chain arrangement, concealed by chain guard 114.

A second separator roller 116 is mounted between a pair of swingable arms 118, 120 and is driven by hydraulic motor 122. Rollers 110 and 116 have bale engaging strips 102, as are found on rollers 92. The separator rollers are driven so as to counterrotate, and now with reference to FIG. 3, roller 110 rotates in a clockwise direction while roller 116 rotates in a counterclockwise direction, thereby enabling the separator to lift a layer of wound material off of a bale 123 and dispense the layer in a windrow alongside the machine, as shown generally at 124 in FIG. 3. The provision of swingable arms 118, 120 enable roller 116 to swing about a pivot point 121 thereby allowing the accommodation of varying thicknesses of material to be removed from bale 123 and dispensed in windrow 124. Arms 118, 120 remain in an at-rest position, as shown in phantom lines in FIG. 3, and move to an operating position, as shown in solid lines in FIG. 3, when the vehicle is in operation and is unwinding hay from a bale.

A modified form of bale separating means is depicted in FIG. 3a. In this configuration, a swingable arm, such as arm 220, includes a member 220a, and a telescoping member 220b, which is constructed to telescope into member 220a. This construction is utilized to facilitate movement of the swingable arms between their at-rest position, shown in solid lines, and their operable position, shown in dash-double-dot lines. An intermediate position, shown in dash-dot lines is depicted wherein member 220b has telescoped into member 220a, as would occur when roller 116 is moved closer to pivot point 121 by the action of a bale during an unloading operation.

Vehicle 10 is connected to a pulling vehicle, generally a tractor, (not shown) by a hitch bar 126. Hitch bar 126 includes a first portion 128 which is secured to frame 12. A second portion 130 is pivotably secured to first portion 128 by pivot pin 132. A ram 134 extends between a first bracket 136, fixed to first portion 128, and a second bracket 138, which is fixed to second portion 130. With ram 134 fully contracted, hitch bar 126 is maintained in an axially aligned condition. When ram 134 is extended, the hitch bar may pivot about pivot pin 132, allowing longitudinal tilting of the vehicle frame relative to the towing vehicle, with the result that a rear end of vehicle 10 is allowed to tilt towards the ground. This feature enables bales carried on vehicle 10 to be unloaded off of the rear end of the vehicle.

The hydraulic rams and motors are powered by a hydraulic pump on the pulling vehicle. A hydraulic valve mount 140 carries electrically operated hydraulic valves 142, which are controlled by the operator on the pulling vehicle. The vehicle of the invention may also be self propelled.

Operation

Referring now to FIG. 3, vehicle 10 is initially drawn up to a bale so that lifting fork members 32, 34 slide under the bale and become parallel to the bale's winding axis. Ram 56 is extended such that lifting fork 30 raises to its unload position, where the bale drops onto first conveyor portion 70, which extends upwards through subframe 76. The bale, such as bale 123, may then be shifted rearward on frame 12 by activating first conveyor portion 70 and second conveyor portion 72 to move the bale off of the subframe onto frame 12. Because portions 70 and 72 operate independently, the bale may be moved as far aft on frame 12 as is desired. Lifting fork 30 is returned to its pick-up position and subsequent bales may be loaded onto the vehicle. The fully loaded vehicle may have typically from three to five bales positioned thereon, as depicted by bales 123, 144, 146 and 148 in FIG. 2. The bales may be transported to a convenient site for storage, and, upon reaching such a site, ram 134 may be extended, allowing the rear end of vehicle 10 to tilt towards the ground. The appropriate conveyor may be activated, and the bales unloaded off of the rear of vehicle 10 as the vehicle is pulled forward by the pulling vehicle.

If the bales have been loaded on the vehicle with the intention of dispensing the baled material, as for cattle feed, a bale is positioned on subframe 76, as is bale 123. The subframe is tilted by ram 86 to lift the bale above the dogs on conveyor portion 70 and the bale rotating means activated. Rollers 92 may be rotated in the appropriate direction to feed a layer of baled material into separator rollers 110 and 116. The separator rollers are activated and lift a layer of material from the surface of the bale and begin dispensing it alongside the vehicle. Rollers 116 and 110 are powered to rotate at a slightly greater angular velocity than are rollers 92. This enables rollers 116 and 110 to lift a layer of wound material off of the surface of the bale more easily. Additionally, roller 116 has a tendency to move up the side of a bale and operate in the position as shown by solid lines in FIG. 3.

In the modified version of the winding-separating means, as depicted in FIG. 3a, roller 116 begins in the at-rest position, with member 220b fully extended, under the influence of its own weight and gravity, within member 220a. As the unwinding operation begins, roller 116 begins moving up the side of the bale, and member 220b is partially telescoped into member 220a. As roller 116 reaches its fully operational position, the force exerted by roller 116 on arm 220 causes member 220b to extend to its full length relative to member 220a, as the roller reaches its operating position.

With either form of the bale separator, rollers 116 and 110 lift a layer of baled material from the surface of the bale and dispense same over the side of the vehicle. As the vehicle is moved forward, a windrow will form providing feed for livestock.

As the bale decreases in size as material is dispensed from the surface thereof, ram 86 is further extended, causing lifting arms 88, 90 to raise subframe 76, tilting the subframe toward the separator rollers. This enables the separator rollers to continually feed baled material off of the bale and onto the ground. Swingable arms 118, 120 allow roller 116 to swing relative to roller 110 to accommodate variations in the thickness of material being dispensed from the bale.

As the first bale is dispensed, subframe 76 is lowered to its down position by contracting ram 86, and the conveyor activated to bring another bale onto the subframe. The subframe is tilted by ram 86 and once again rollers 92, 110 and 116 are activated to dispense the material alongside the vehicle.

Rollers 92 are rotatable in a clockwise or counter clockwise direction. For a bale wound with a spiral wind such as found in bale 123, rollers 92 and 110 are rotated clockwise and roller 116 is rotated counter clockwise, as viewed in FIG. 3. If a bale is wound with a spiral wind opposite to that of bale 123, rollers 92 are rotated counter clockwise and rollers 110 and 116 are rotated as previously described. Rollers 110 and 116 are operable to lift a layer of baled material from the bale as the bale is rotated regardless of the direction of winding on the bale. Engaging strips 102 are operable to lift and separate a layer of material as the bale is brought to bear against rollers 110 and 116.

In the preferred embodiment, vehicle 10 is capable of handling three to five wound bales and substantially continuously dispensing the baled material of the three or four bales. Once the load has been completely dispensed, the vehicle may be reloaded through operation of lifting fork 30.

Thus a vehicle has been disclosed which is operable to pick up wound bales from a position on the ground, load multiple bales onto the vehicle frame and either transport the bales to a storage site where they may be unloaded off the rear end of the vehicle, or transport the bales to a feeding site where the baled material is dispensed in windrows to provide food for livestock.

Although a preferred embodiment of the invention has been disclosed, it should be appreciated that variations and modifications may be made thereto without departing from the spirit of the invention.

It is claimed and desired to secure by Letters Patent:

1. A field vehicle for handling wound cylindrical bales comprising:
   an elongate mobile vehicle frame;
   an endless power-driven conveyor mounted on said vehicle frame having a substantially horizontal upper reach extending longitudinally of the vehicle adapted with movement of the conveyor to transfer a bale resting thereon in a direction extending longitudinally of the vehicle by engaging the underside of the bale;
   a subframe and at least a pair of rotatable rollers rotatably mounted on said subframe located to either side of said upper reach of the endless conveyor with the axis of the rollers extending longitudinally of the vehicle;
   a movable mounting for the subframe accommodating shifting of the subframe from a lowered position where said rollers lie beneath the level of said upper reach of the conveyor and a raised position where the rollers are above said upper reach and support a bale in a position elevated above said upper reach;
   means for rotating said rollers on said subframe; and bale unrolling means mounted on said vehicle frame adjacent said subframe for unrolling a wound bale positioned on said rollers of said subframe.

2. The vehicle of claim 1 wherein the mounting for the subframe comprises pivot means pivotally mounting said subframe for pivotal movement about an axis extending longitudinally of the vehicle, said subframe when moving from a lowered to a raised position pivoting about said pivot means and in said raised position inclining toward said bale unrolling means.

3. A field vehicle for handling wound cylindrical bales comprising:

an elongate mobile vehicle frame and means mounted on and extending along the length of the frame defining an elongate bale storage region for holding stored bales;

an elongate endless conveyor mounted on the frame having an upper reach extending along the base of said bale storage region for transporting, endo, bales along the length of said storage region by engaging the undersides of the bales;

an endless second conveyor mounted on said frame having an upper reach extending from the end of the upper reach of said first-mentioned conveyor for transporting bales by engaging the undersides thereof in a loading region located beyond one end of said storage region;

side-loading means mounted on said frame for picking up a bale resting on the ground and located to one side of the vehicle and placing the bale in said loading region on said second conveyor; and bale unrolling means mounted on said frame for unrolling a wound bale in said loading region and dispensing the matter of the bale on the ground along a side of said frame;

said first-mentioned and second conveyors being independently operable to provide for conveying of bales independently of each other;

said unrolling means including a subframe and means movably mounting the subframe on said vehicle frame with the subframe being shiftable between a lowered and a raised position, conveyor rollers mounted on said subframe rotatable about axes paralleling said second conveyor and disposed on either side of said upper reach of said second conveyor, said rollers being below the level of said upper reach of said second conveyor with the subframe in said lowered position, said rollers with movement of the subframe to said raised position moving to an elevation located above said upper reach of said second conveyor thereby to support a bale with such raised above said second conveyor.

4. The vehicle of claim 3 wherein said unrolling means includes winding-separating means located above and adjacent said subframe, and the means movably mounting the subframe comprises pivot means whereby the subframe, when raised, pivots about said pivot means to incline toward said winding-separating means, and further including powered means for producing pivotal movement of the subframe.

* * * * *